United States Patent
Nan et al.

(10) Patent No.: US 10,914,122 B2
(45) Date of Patent: Feb. 9, 2021

(54) LIQUID INJECTION TYPE REAMER BIT

(71) Applicant: HENAN POLYTECHNIC UNIVERSITY, Henan (CN)

(72) Inventors: Hua Nan, Henan (CN); Deyi Nan, Henan (CN); Faqiang Su, Henan (CN); Bingjian Wang, Henan (CN)

(73) Assignee: HENAN POLYTECHNIC UNIVERSITY, Jiaozuo (CN)

( * ) Notice: Subject to any disclaimer, the term of this patent is extended or adjusted under 35 U.S.C. 154(b) by 0 days.

(21) Appl. No.: 16/985,214

(22) Filed: Aug. 4, 2020

(65) Prior Publication Data

US 2020/0362641 A1    Nov. 19, 2020

Related U.S. Application Data

(63) Continuation of application No. PCT/CN2019/078022, filed on Mar. 13, 2019.

(30) Foreign Application Priority Data

May 30, 2018   (CN) .......................... 2018 1 0534411

(51) Int. Cl.
*E21B 10/32*  (2006.01)
*E21B 10/60*  (2006.01)
*B23D 77/00*  (2006.01)

(52) U.S. Cl.
CPC ............ *E21B 10/322* (2013.01); *B23D 77/00* (2013.01); *E21B 10/325* (2013.01); *E21B 10/60* (2013.01); *B23D 2277/085* (2013.01); *B23D 2277/2442* (2013.01)

(58) Field of Classification Search
CPC ........ E21B 10/26; E21B 10/32; E21B 10/322; E21B 10/325; E21B 10/327; B23D 2277/085

See application file for complete search history.

(56) References Cited

U.S. PATENT DOCUMENTS

| | | | | |
|---|---|---|---|---|
| 2,238,377 A | * | 4/1941 | Strang | ...................... E21B 10/34 |
| | | | | 175/291 |
| 2,822,150 A | * | 2/1958 | Muse | .................... E21B 10/322 |
| | | | | 175/266 |
| 3,208,540 A | * | 9/1965 | Park | ...................... E21B 10/322 |
| | | | | 175/269 |

(Continued)

FOREIGN PATENT DOCUMENTS

| | | |
|---|---|---|
| CN | 203239234 U | 10/2013 |
| CN | 203701974 U | 7/2014 |
| CN | 106988773 A | 7/2017 |

*Primary Examiner* — Blake E Michener
(74) *Attorney, Agent, or Firm* — Wayne & Ken, LLC; Tony Hom (57) ABSTRACT

The present invention discloses a liquid injection type reamer bit, which comprises a drilling and reaming rod (1), a drilling tool (2) and reaming tools (3). The reamer bit is adopted to perform drilling and reaming operations respectively in a water pressure adjusting manner, has the advantages of simple structure, convenient operation, small volume, light weight, flexible and reliable technology, unified power sources for drilling and reaming, stable reaming, easy recovery of tools, and realization of reaming while drilling, greatly improves the anchoring reliability of anchor bolts, and ensures the safety of workers during underground work.

2 Claims, 6 Drawing Sheets

(56) References Cited

U.S. PATENT DOCUMENTS

| | | | | |
|---|---|---|---|---|
| 4,589,504 A * | 5/1986 | Simpson | ............... | E21B 10/60 |
| | | | | 175/267 |
| 4,846,290 A * | 7/1989 | Jones | ............... | E21B 10/12 |
| | | | | 175/269 |
| 5,201,817 A * | 4/1993 | Hailey | ............... | E21B 10/322 |
| | | | | 166/55.8 |
| 5,351,758 A | 10/1994 | Henderson et al. | | |
| 5,735,359 A * | 4/1998 | Lee | ............... | E21B 10/322 |
| | | | | 175/269 |
| 5,853,054 A * | 12/1998 | McGarian | ............... | E21B 10/322 |
| | | | | 175/267 |
| 7,293,616 B2 * | 11/2007 | Tulloch | ............... | E21B 10/322 |
| | | | | 175/269 |
| 7,383,900 B2 * | 6/2008 | Zijsling | ............... | E21B 10/322 |
| | | | | 175/267 |
| 10,633,927 B2 * | 4/2020 | Nan | ............... | E21B 10/32 |
| 2018/0163480 A1 * | 6/2018 | Evans | ............... | E21B 44/00 |
| 2018/0266186 A1 * | 9/2018 | Burca | ............... | E21B 10/322 |
| 2019/0178055 A1 * | 6/2019 | Deolalikar | ............... | E21B 34/12 |
| 2019/0368275 A1 * | 12/2019 | Nan | ............... | E21B 10/32 |

* cited by examiner

LIQUID INJECTION TYPE REAMER BIT

CROSS-REFERENCE TO RELATED APPLICATIONS

This application is a continuation of International Patent Application No. PCT/CN2019/078022, filed on Mar. 13, 2019, which claims the benefit of priority from Chinese Patent Application No. 201810534411.7, filed on May 30, 2018. The content of the aforementioned applications, including any intervening amendments thereto, is incorporated herein by reference in its entirety.

TECHNICAL FIELD

The present invention belongs to the technical field of roadway support, and particularly relates to a liquid injection type reamer bit.

BACKGROUND OF THE PRESENT INVENTION

Anchor bolts used in underground roadway support have the characteristics of simple structure, convenient construction, strong adaptability and the like. Therefore, the anchor bolt support has become a main way of roadway support in recent years, but a main failure form of the anchor bolts in engineering application of the anchor bolt support is the sliding instability between the anchor bolts and hole walls when coal ash adhered to the hole walls, broken soft surrounding rock or the like is encountered during supporting and anchoring. Tests and studies show that the reaming of hole bottoms of anchoring holes is one of means to solve the problem of sliding instability of the anchor bolts; and in this way, the anchor bolts can be firmly anchored with the hole walls of the anchoring holes through an injected anchoring agent, but no device special for reaming the hole bottoms while drilling the anchoring holes is available at present.

Technical Problems

To solve defects in the prior art, the present invention provides a liquid injection type reamer bit, which completes the drilling and reaming operations of the anchor bolts by changing hydraulic power and utilizing the characteristics of reaming machinery. The reamed holes are conical holes, thereby changing a weak stress state of the anchor bolts in general cylindrical holes, enhancing the anchoring force of the anchor bolts, effectively solving the problem of sliding instability between the anchor bolts and surrounding rocks, and having great significance for underground safety operation.

Technical Solution

To solve the above technical problems, the following technical solution is adopted in the present invention: a liquid injection type reamer bit comprises a drilling and reaming rod, a drilling tool and reaming tools, wherein a center line of the drilling and reaming rod is arranged along a front and rear direction; a cylindrical high-pressure water cavity with an open front end is coaxially formed in a front end of the drilling and reaming rod; a water injection hole is formed in the drilling and reaming rod along the direction of the center line; the front end of the water injection hole is communicated with the high-pressure water cavity; a rear end of the drilling tool is slidably connected in the high-pressure water cavity; a plurality of reaming tools are uniformly arranged along a circumferential direction of a front end face of the drilling and reaming rod; and front inner sides of the reaming tools are in jacking and pressing fit with conical surfaces of the reaming tools.

The drilling tool is of a conical structure with thick front and thin rear, wherein a plurality of first diamond tool bits are uniformly arranged on a front end face of the drilling tool; a water through hole is formed inside the drilling tool along the vertical direction; a sliding seat slidably connected to an inner wall of the high-pressure water cavity is arranged at the rear end of the drilling tool; a spline groove is formed in the inner wall of the high-pressure water cavity along the axial direction; splines slidably fitted with the spline groove are uniformly arranged on the outer circumference of the sliding seat; and an annular retaining ring for limiting the position of the sliding seat is fixedly arranged in the front of the inner wall of the high-pressure water cavity.

A plurality of second diamond tool bits are uniformly arranged on the inner side faces of the reaming tools, wherein the front end of each reaming tool is hinged to the front end of the drilling and reaming rod through a pin shaft; the pin shaft is parallel to the tangential direction of the drilling and reaming rod; a bump located between each reaming tool and the drilling tool is arranged inside the rear end of each reaming tool; a diamond wear-resistant layer is arranged inside each bump; and an extension spring is arranged between the rear side of each bump and the annular retaining ring. The diamond wear-resistant layer inside each bump is in jacking and pressing fit with the conical surface of the drilling tool through a hinge point of the pin shaft under the action of the extension spring.

The front end of the water injection hole is in transitional communication with the rear end of the high-pressure water cavity through a bell mouth with large front and small rear.

Beneficial Effects

By adopting the above technical solution, the reaming tools are usually in a contracted state under the action of the extension spring; and the inner sides of the front ends of the reaming tools are in contact with the outer circumference of the front part of the drilling tool. When working, the rear end of the drilling and reaming rod according to the present invention is mounted at the front end of a drill pipe; and high-pressure water enters the water injection hole inside the drilling and reaming rod through a water hole inside the drill pipe. After the water passes through the bell mouth, the water pressure will be reduced, thereby filling the high-pressure water cavity. The diameter of the water through hole in the drilling tool is much smaller than that of the high-pressure water cavity, so the high-pressure water will jack the sliding seat of the drilling tool forward, so that the drilling tool stretches forward; and the sliding seat of the drilling tool cannot separate from the high-pressure water cavity due to the blocking of the retaining ring. Since the outer circumference of the drilling tool is a cone structure with thick front and thin rear, the outer circumference surface of the drilling tool always keeps jacking and pressing contact with the lower part of the inner end of each bump under the action of the extension spring. As the drilling tool moves forward, the bumps rotate backward with the pin shaft as the center line; and the reaming tools also rotate inward with the pin shaft as the center line. The rotation diameters of the reaming tools are always smaller than that of the drilling tool during drilling. Meanwhile, a drilling machine drives the drill pipe and the drilling and reaming rod to rotate at high speed; and the drilling and reaming rod drives the drilling tool to rotate through the fitting of the splines and the spline groove, so that the first diamond tool bits at the front end of the drilling tool drill a roadway wall. When drilling to a certain depth and requiring reaming, the water pressure is gradually reduced, so that the sliding seat of the drilling tool moves backward along the high-pressure water cavity; and the drilling tool also moves backward. The conical surface of the drilling tool will drive the bumps arranged inside the lower ends of the reaming tools to rotate forward with the pin shaft as the center line, so that the extension springs are further stretched; the reaming tools also rotate outward with the pin shaft as the center line; and the rotation diameters of the reaming tools are gradually increased.

Workers will actively push the drilling machine forward during drilling, so the drilling tool will fall to a last part of the high-pressure water cavity after the water pressure is reduced. The reaming tools will be opened maximally and the reaming diameters are also maximum at this time, thereby further reaming the drill hole. When requiring to retreat the drill pipe, only the water pressure needs to be increased, so that the sliding seat is driven by the water pressure to move forward in the high-pressure water cavity; the drilling tool also moves forward; the outer diameter of a contact position between each bump and an outer conical surface of the drilling tool is gradually reduced; the bumps rotate backward with the pin shaft as the center line under the action of the extension spring; the reaming tools also rotate inward with the pin shaft as the center line; the rotation diameters of the reaming tools are gradually reduced until the rotation diameters of the reaming tools are less than or equal to a maximum drilling diameter of the drilling tool; and then the drill pipe and a reamer are pulled backward to retreat from the drill hole.

The key point in the present invention is that the diamond wear-resistant layer inside each bump is in jacking and pressing fit with the outer conical surface of the drilling tool. The diamond wear-resistant layer can reduce the wear of the bumps, thereby ensuring that the bumps are driven to rotate forward when the drilling tool moves backward, and the extension spring is further stretched at the same time.

The spline groove is formed in the inner wall of the high-pressure water cavity along the axial direction in the present invention; and the splines slidably fitted with the spline groove are uniformly arranged on the outer circumference of the sliding seat, thereby playing a role of axial sliding fit and also playing a role of driving the drilling tool to rotate by the rotation of the drill pipe.

In conclusion, the drilling and reaming operations are respectively performed by adjusting the water pressure, and the water flow also plays a role of discharging coal dust and rock wastes during drilling from an annular gap between a drilling wall and the drilling and reaming rod. The present invention has the advantages of simple structure, convenient operation, small volume, light weight, flexible and reliable technology, unified power sources of drilling and reaming, stable reaming, easy recovery of tools, and realization of reaming while drilling, greatly improves the anchoring reliability of the anchor bolts, and ensures the safety of the workers during underground work.

DETAILED DESCRIPTION OF THE PRESENT INVENTION

Figure 1:
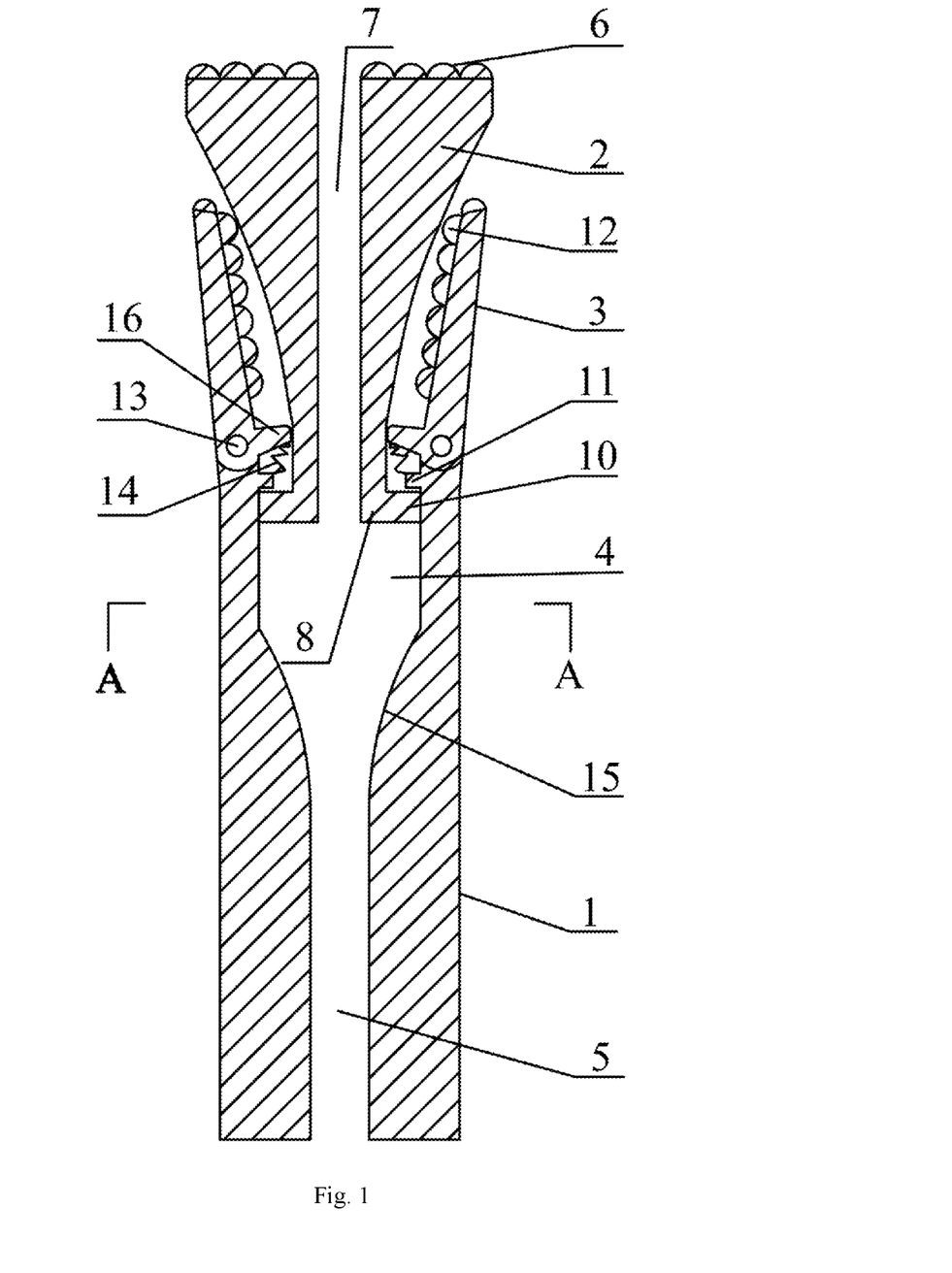
FIG. 1 is a structural schematic diagram of the present invention.
Figure 2:
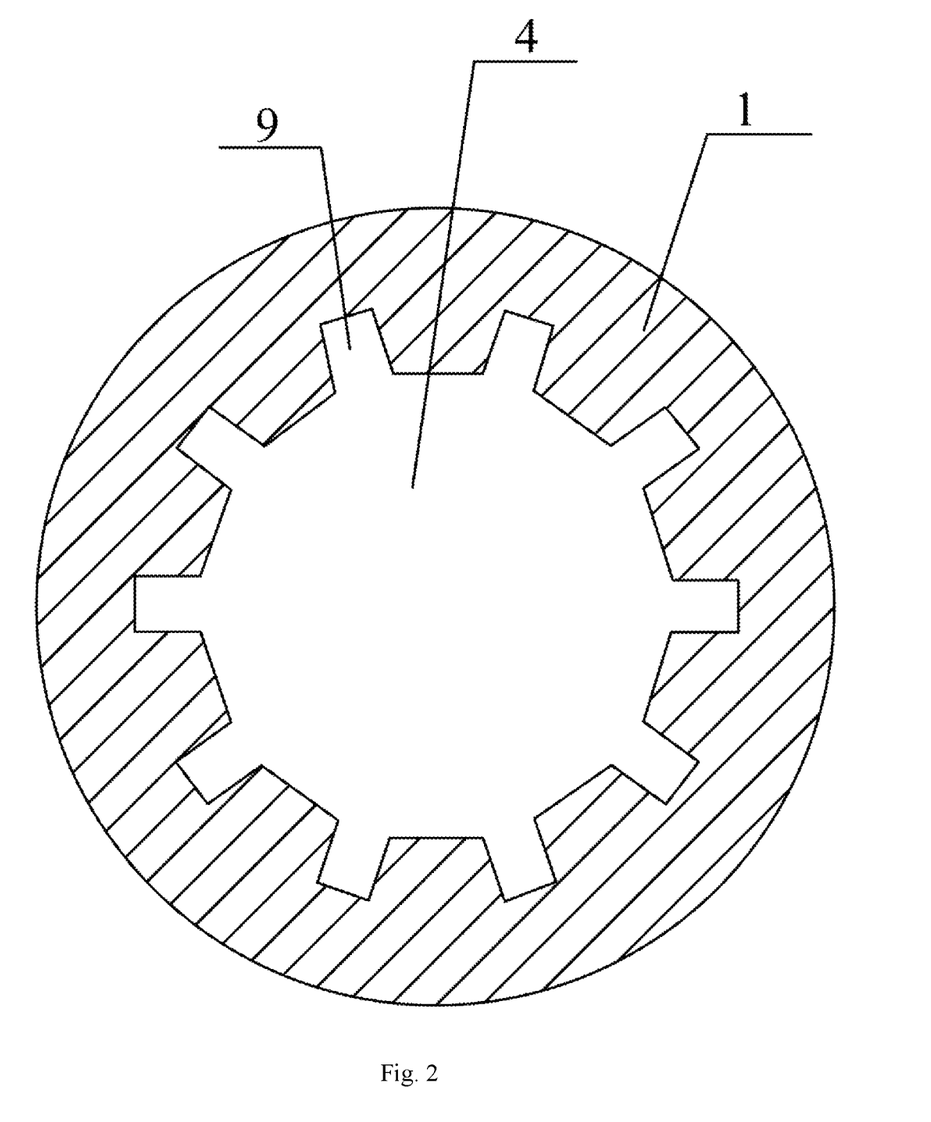
FIG. 2 is a section view of A-A in FIG. 1.
Figure 3:
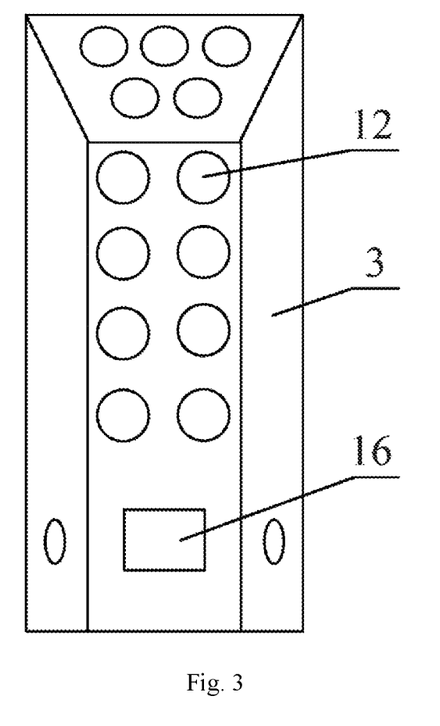
FIG. 3 is a side view of a reaming tool in FIG. 1.

As shown in FIG. 1 to FIG. 3, a liquid injection type reamer bit of the present invention comprises a drilling and reaming rod 1, a drilling tool 2 and reaming tools 3. A center line of the drilling and reaming rod 1 is arranged along a front and rear direction; a cylindrical high-pressure water cavity 4 with an open front end is coaxially formed in a front end of the drilling and reaming rod 1; a water injection hole 5 is formed in the drilling and reaming rod 1 along the direction of the center line; the front end of the water injection hole 5 is communicated with the high-pressure water cavity 4; a rear end of the drilling tool 2 is slidably connected in the high-pressure water cavity 4; a plurality of reaming tools 3 are uniformly arranged along a circumferential direction of a front end face of the drilling and reaming rod 1; and front inner sides of the reaming tools 3 are in jacking and pressing fit with conical surfaces of the reaming tools 3.

The drilling tool 2 is of a conical structure with thick front and thin rear. A plurality of first diamond tool bits 6 are uniformly arranged on a front end face of the drilling tool 2; a water through hole 7 is formed inside the drilling tool 2 along the vertical direction; a sliding seat 8 slidably connected to an inner wall of the high-pressure water cavity 4 is arranged at the rear end of the drilling tool 2; a spline groove 9 is formed in the inner wall of the high-pressure water cavity 4 along the axial direction; splines 10 slidably fitted with the spline groove 9 are uniformly arranged on the outer circumference of the sliding seat 8; and an annular retaining ring 11 for limiting the position of the sliding seat 8 is fixedly arranged in the front of the inner wall of the high-pressure water cavity 4.

A plurality of second diamond tool bits 12 are uniformly arranged on the inner side faces of the reaming tools 3. The front end of each reaming tool 3 is hinged to the front end of the drilling and reaming rod 1 through a pin shaft 13; the pin shaft 13 is parallel to the tangential direction of the drilling and reaming rod 1; a bump 16 located between each reaming tool 3 and the drilling tool 2 is arranged inside the rear end of each reaming tool 3; a diamond wear-resistant layer is arranged inside each bump 16; and an extension spring 14 is arranged between the rear side of each bump 16 and the annular retaining ring 11. The diamond wear-resistant layer inside each bump 16 is in jacking and pressing fit with the conical surface of the drilling tool 2 through a hinge point of the pin shaft 13 under the action of the extension spring 14.

The front end of the water injection hole 5 is in transitional communication with the rear end of the high-pressure water cavity 4 through a bell mouth 15 with large front and small rear. The bell mouth 15 plays a role of reducing the resistance of the water flow and keeping the water pressure uniform with the pressure on the rear side face of the sliding seat 8.

Figure 4:
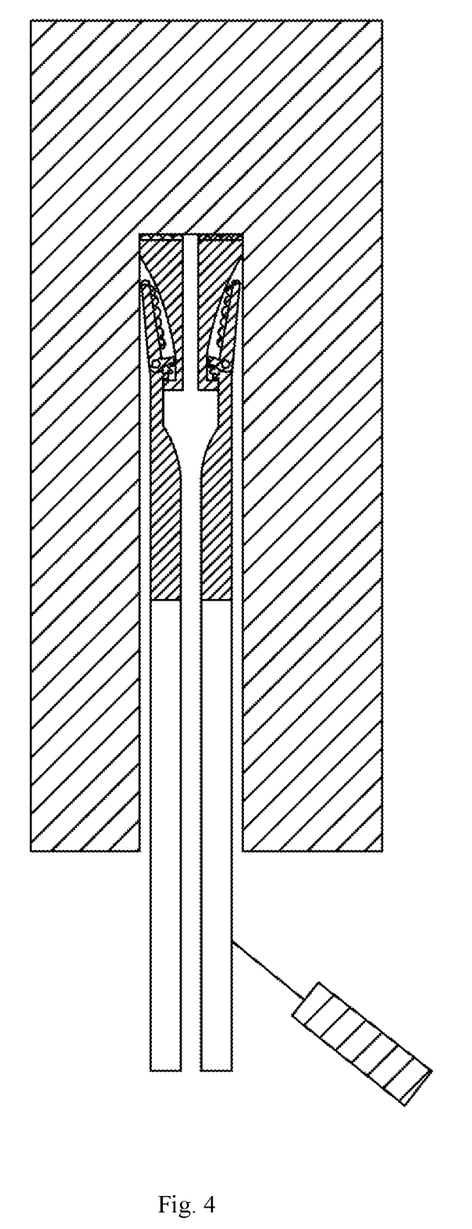
FIG. 4 is a schematic diagram of drilling with the present invention.
Figure 5:
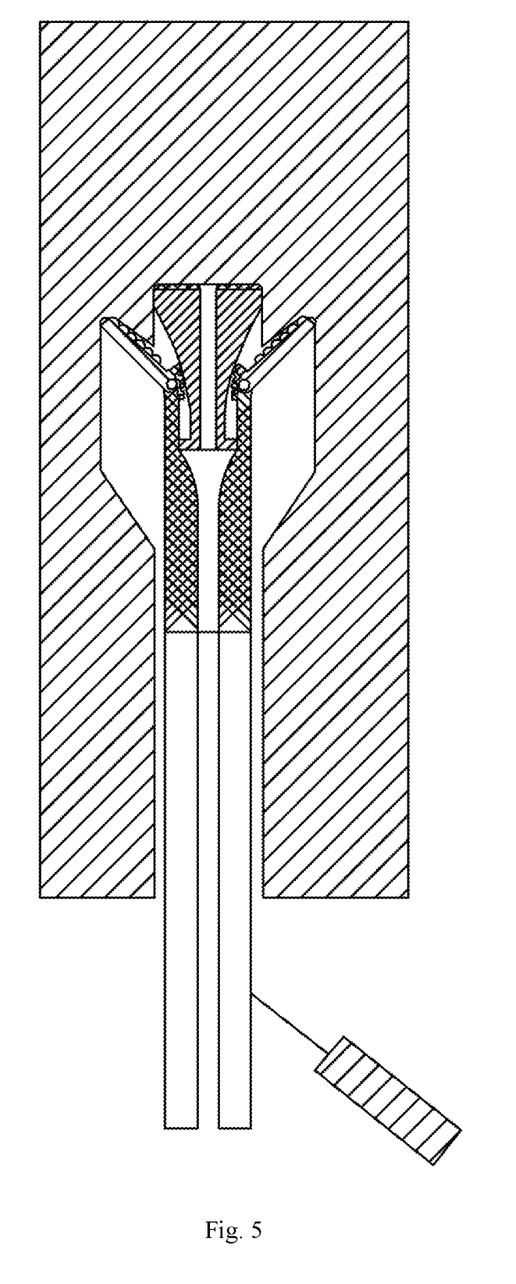
FIG. 5 is a schematic diagram of reaming with the present invention.
Figure 6:
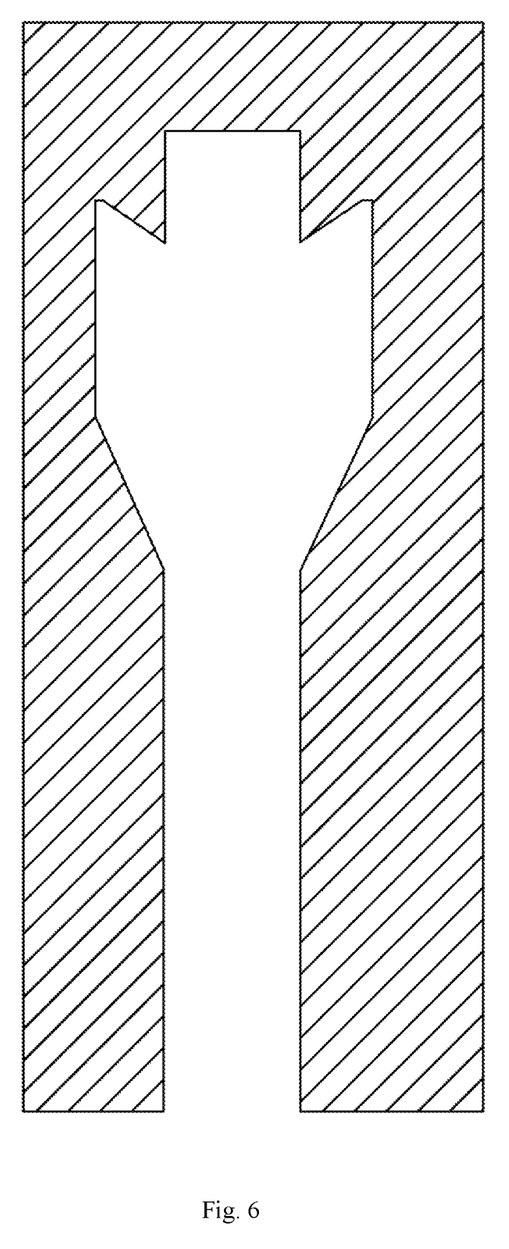
FIG. 6 is a schematic diagram of drilling and reaming after a drill pipe and a reamer are retreated.

During working of the present invention, as shown in FIGS. 4-6, the reaming tools 3 are usually in a contracted state under the action of the extension spring 14; and the inner sides of the front ends of the reaming tools 3 are in contact with the outer circumference of the front part of the drilling tool 2. When working, the rear end of the drilling and reaming rod 1 according to the present invention is mounted at the front end of a drill pipe; and high-pressure water enters the water injection hole 5 inside the drilling and reaming rod 1 through a water hole inside the drill pipe. After the water passes through the bell mouth 15, the water pressure will be reduced, thereby filling the high-pressure water cavity 4. The diameter of the water through hole 7 in the drilling tool 2 is much smaller than that of the high-pressure water cavity 4, so the high-pressure water will jack the sliding seat 8 of the drilling tool 2 forward, so that the drilling tool 2 stretches forward; and the sliding seat 8 of the drilling tool 2 cannot separate from the high-pressure water cavity 4 due to the blocking of the retaining ring 11. Since the outer circumference of the drilling tool 2 is a cone structure with thick front and thin rear, the outer circumference surface of the drilling tool 2 always keeps jacking and pressing contact with the lower part of the inner end of each bump 16 under the action of the extension spring 14. As the drilling tool 2 moves forward, the bumps 16 rotate backward with the pin shaft 13 as the center line; and the reaming tools 3 also rotate inward with the pin shaft 13 as the center line. The rotation diameters of the reaming tools 3 are always smaller than that of the drilling tool 2 during drilling. Meanwhile, a drilling machine drives the drill pipe and the drilling and reaming rod 1 to rotate at high speed; and the drilling and reaming rod 1 drives the drilling tool 2 to rotate through the fitting of the splines 10 and the spline groove 9, so that the first diamond tool bits 6 at the front end of the drilling tool 2 drill a roadway wall. Then, the drilling tool 2 is driven by the rotation effect of the drill pipe to rotate and drill. When drilling to a certain depth and requiring reaming, the water pressure is gradually reduced, so that the sliding seat 8 of the drilling tool 2 moves backward along the high-pressure water cavity 4; and the drilling tool 2 also moves backward. The conical surface of the drilling tool 2 will drive the bumps 16 arranged inside the lower ends of the reaming tools 3 to rotate forward with the pin shaft 13 as the center line, so that the extension springs 14 are further stretched; the reaming tools 3 also rotate outward with the pin shaft 13 as the center line; and the rotation diameters of the reaming tools 3 are gradually increased. Workers will actively push the drilling machine forward during drilling, so the drilling tool 2 will fall to a last part of the high-pressure water cavity 4 after the water pressure is reduced. The reaming tools 3 will be opened maximally and the reaming diameters are also maximum at this time, thereby further reaming the drill hole. When requiring to retreat the drill pipe, only the water pressure needs to be increased, so that the sliding seat 8 is driven by the water pressure to move forward in the high-pressure water cavity 4; the drilling tool 2 also moves forward; the outer diameter of a contact position between each bump 16 and an outer conical surface of the drilling tool 2 is gradually reduced; the bumps 16 rotate backward with the pin shaft 13 as the center line under the action of the extension spring 14; the reaming tools 3 also rotate inward with the pin shaft 13 as the center line; the rotation diameters of the reaming tools 3 are gradually reduced until the rotation diameters of the reaming tools 3 are less than or equal to a maximum drilling diameter of the drilling tool 2; and then the drill pipe and a reamer are pulled backward to retreat from the drill hole.

The spline groove 9 is formed in the inner wall of the high-pressure water cavity 4 along the axial direction in the present invention; and the splines 10 slidably fitted with the spline groove 9 are uniformly arranged on the outer circumference of the sliding seat 8, thereby playing a role of axial sliding fit and also playing a role of driving the drilling tool 2 to rotate by the rotation of the drill pipe.

The present embodiment does not limit the shape, material and structure of the present invention in any form. Any simple amendment, equivalent change and modification made to the above embodiment based on the technical essence of the present invention belong to the protection scope of the technical solution of the present invention.

What is claimed is:

1. A liquid injection bit reamer for a mine, comprising a drilling and reaming rod, a drilling tool and reaming tools, wherein a center line of the drilling and reaming rod is arranged along a front and rear direction; a cylindrical high-pressure water cavity with an open front end is coaxially formed in a front end of the drilling and reaming rod; a water injection hole is formed in the drilling and reaming rod along the center line; a front end of the water injection hole is communicated with the high-pressure water cavity; a rear end of the drilling tool is slidably connected in the high-pressure water cavity; a plurality of reaming tools are uniformly arranged along a circumferential direction of a front end face of the drilling and reaming rod; and inner side faces of the reaming tools are configured to tightly abutted against a conical surface of the drilling tool;

a plurality of first diamond cutters are uniformly arranged on a front end face of the drilling tool; a water through hole is formed inside the drilling tool along the center line; the slidable rear end of the drilling tool comprises a sliding seat slidably connected to an inner wall of the high-pressure water cavity; a spline groove is formed in the inner wall of the high-pressure water cavity along the center line; splines slidably fitted with the spline groove are uniformly arranged on an outer circumference of the sliding seat; and an annular retaining ring for limiting a position of the sliding seat is fixedly arranged in front of the inner wall of the high-pressure water cavity;

a plurality of second diamond cutters are uniformly arranged on the inner side faces of the reaming tools; a rear end of each reaming tool is hinged to the front end of the drilling and reaming rod through a pin shaft; the pin shaft is parallel to a tangential direction of the drilling and reaming rod; a bump located between each reaming tool and the drilling tool is arranged on the rear end of each reaming tool; a diamond wear-resistant layer is arranged on each bump; an extension spring is arranged between a rear side of each bump and the annular retaining ring; and the diamond wear-resistant layer on each bump is configured to tightly abutted against the conical surface of the drilling tool through a hinge point of the pin shaft under an action of the extension spring.

2. The liquid injection bit reamer for the mine according to claim 1, wherein the front end of the water injection hole is in transitional communication with a rear end of the high-pressure water cavity through a bell mouth with large front and small rear.

* * * * *